March 5, 1968 — J. HENRY-BAUDOT — 3,372,293
DISCOIDAL ELECTRIC ROTARY MACHINES
Filed July 27, 1964 — 2 Sheets-Sheet 1

United States Patent Office 3,372,293
Patented Mar. 5, 1968

3,372,293
DISCOIDAL ELECTRIC ROTARY MACHINES
Jacques Henry-Baudot, Antony, France, assignor to Société d'Electronique et d'Automatisme, Courbevoie, France
Filed July 27, 1964, Ser. No. 385,242
Claims priority, application France, Sept. 4, 1963, 946,579, Patent 1,375,231
9 Claims. (Cl. 310—268)

The present invention concerns improvements in or relating to D.C. dynamoelectric machines operating with a low voltage, of the order of a few volts, and a high value of electrical current which may reach several hundred amperes.

A dynamoelectric machine in accordance with the present invention is mainly characterized by the combination of a stator comprising at least one heteropolar field structure of permanent magnet poles and defining a magnetic airgap, wherein the orientation of the magnetic field regularly reverses in different zones, of a rotor located within said airgap for rotation, comprising a plurality of conductor blades which are at least partly bare on one face thereof and arranged in at least one layer with their greater dimension substantially oriented along the greater dimension of said airgap, and of brushes mounted in registration with the magnetic axes of said field structure and interconnected to D.C. transducing terminals, each one of said brushes short-circuiting at least two of said conductor blades at ends thereof not otherwise short-circuited as the conductor blades pass under it during the rotation of the rotor.

According to a first embodiment, the conductor blades of the rotor are permanently short-circuited at one end thereof, and there are brushes bearing against their opposite ends only.

According to another embodiment, each blade is totally separated from the other ones, and there are pairs of brushes near the opposite ends of the blades.

The invention is applicable to axial airgap rotary machines as well as to cylindrical airgap rotary machines. It will be described in further detail with reference to the accompanying drawings which illustrate embodiments thereof, from which may be derived any further embodiments without departing from the scope of the invention as defined in the appended claims.

Figure 1:
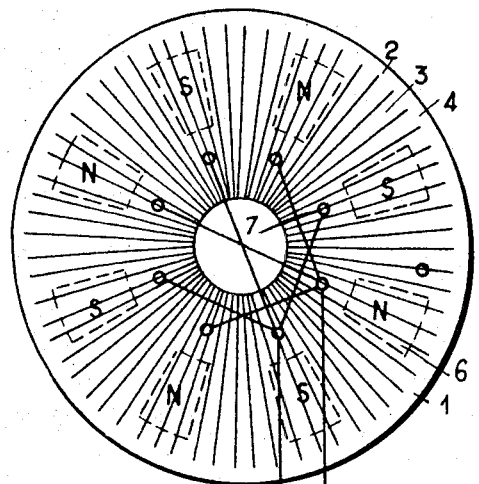
FIG. 1 is a plan view of one face of a rotor of a first embodiment of the present invention including the locations of the brushes and the interconnection thereof.
Figure 2:
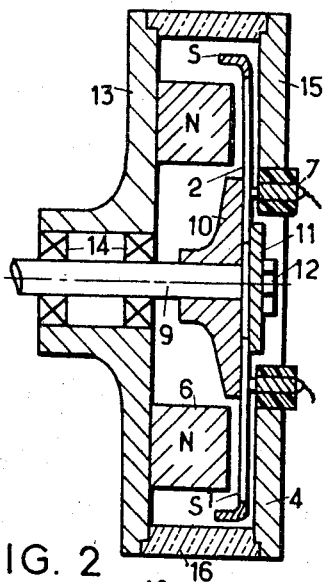
FIG. 2 is a cross-sectional view of a motor including the rotor of FIG. 1.
Figure 5:
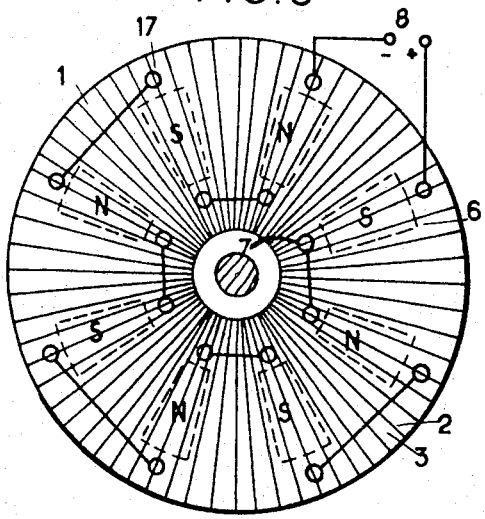
FIG. 5 is a plan view of the rotor of a still further embodiment of the present invention including the location of the brushes and the interconnection thereof.
Figure 6:
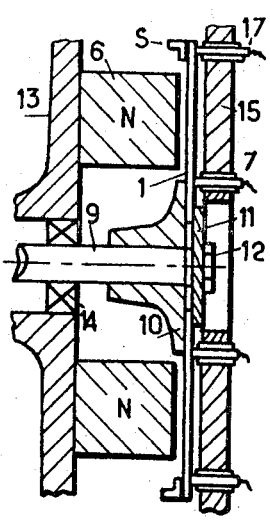
FIG. 6 is a partial cross-sectional view of a motor including the rotor of FIG. 5.
Figure 7:
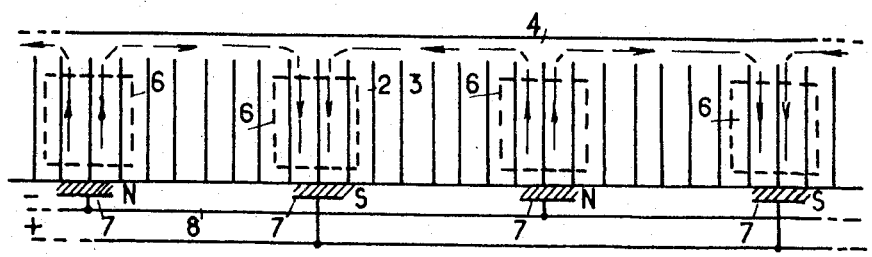
Figure 8:
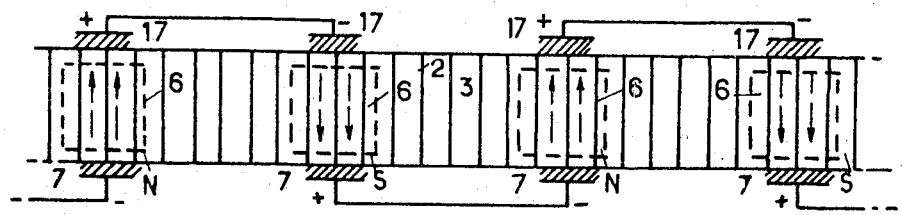
Figure 9:
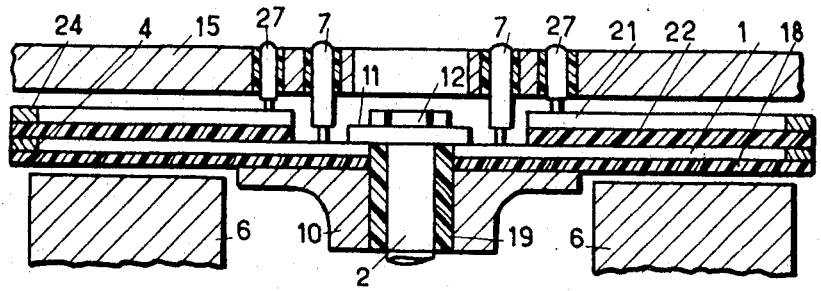
Figure 10:
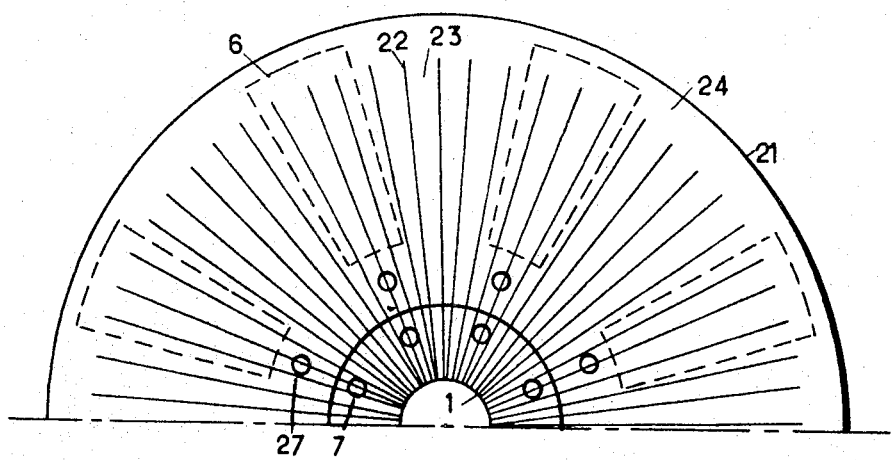

FIGS. 7 and 8, respectively, are diagrammatic illustrations of in planar development form of the arrangement of the brushes and rotors of the embodiments illustrated in FIGS. 1 and 2 and in FIGS. 5 and 6;

FIG. 9 is a partial cross-sectional view of a motor in accordance with the present invention in which the rotor includes a pair of conductor layers for increasing the power of the machine; and FIG. 10 is a partial top plan view of the rotor structure of the motor of FIG. 9 including the location of the brush members.

Referring to FIGS. 1 and 2, the stator of the machine comprises a ring of permanent magnetic pole pieces 6 regularly alternate north and south, (N) and (S). The number of such poles is relatively high, eight as shown or a higher one; on the other hand the magnetic angular coverage of each pole piece is advantageously reduced, say up to 60 electrical degrees for instance, hence an appreciable economy of magnets in such a machine. While the magnetic poles are shown as separate pole pieces 6, they may be replaced by a single annular magnetic ring of a material such as ferrite with magnetic poles permanently magnetized therein.

A magnetic plate 15 for the return of the magnetic flux cooperates with the magnet ring 6 to define a narrow magnetic airgap. Such a plate may be replaced, when required, by a magnet pole ring similar to 6 with a shift of one polar pitch from one ring to the other one. The plate 15 is fixed and, for instance as shown, secured by struts 16 to the yoke plate 13 carrying the magnets 6.

A discoidal rotor 1 is mounted at one end of a shaft 9 by a hub 10 cooperating with a washer 11 secured by a nut 12. The disc is for instance made from a conductive member wherein radial slots 2 define a plurality of radial bars or blades 3 which are short-circuited at their outer ends by a conductive ring 4 which is left unslotted in the disc. The outer edge of said ring 4 may be folded as shown at 5 in FIG. 2 for reinforcement purposes.

Centered on each axis of a magnetic pole 6 is placed a brush 7 carried for instance by the flux return plate 15 at a location near the inner ends of the conductor blades of the rotor 1. The brushes which are placed along the lines S of the magnetic pole areas are connected together to one electrical terminal of a pair and the brushes placed along the axes N are similarly connected together to the other terminal of said pair of terminals 8. Such terminals are transducer terminals either for carrying electrical direct current to the machine or from the machine depending upon whether the machine operates as a generator or a motor. Each brush ensures the short-circuiting of at least two consecutive conductor blades during the rotation of the rotor 1.

Figure 3:
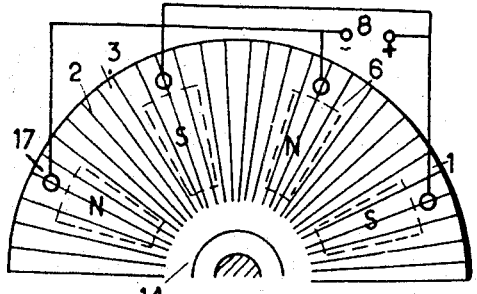
FIGS. 3 and 4 show an alternative embodiment of the rotor and motor shown in FIGS. 1 and 2.
Figure 4:
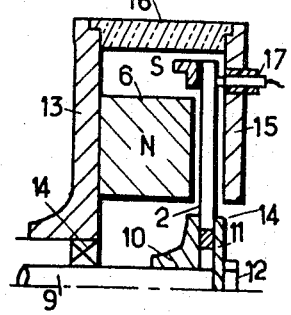

Instead of short-circuiting the blades 3 at their outer ends as in FIGS. 1 and 2, the said bars may be short-circuited at their inner ends from an integral inner ring 14 as shown in FIGS. 3 and 4. The brushes 17 are consequently arranged near the outer edge of the rotor disc in the embodiment shown in FIGS. 3 and 4. A rigidity increasing annulus 5, which is of insulating material may be provided and glued to the outer edge of the rotor disc. Alternatively, said annulus may be made of conductive material if the glue film is made sufficiently insulating per se.

In any case it must be understood that the inner fixation of the disc 1 on the hub is so made that the conductor blades are relatively insulated from each other.

In a different fashion, alternative to the first described embodiment, the conductor blades 3 may be totally cut off along their length, the slots 2 being made from the inner to the outer edge of the rotor disc 1, as shown in FIGS. 5 and 6. The separate blades are mechanically united at their inner ends by their mounting on the hub 10 and at their outer ends, preferably, by the glued annulus 5. In an alternative, see FIG. 9 in this respect, the conductor blades may be secured, by gluing for instance, to a thin carrier insulating disc. "Glue" is intended here to denote any kind of strong adhesive such as thermosetting or polymerisable resin for instance. Such a thin carrier disc may be used, if wanted, in the embodiments of FIGS. 1 to 4, and in such case the strengthening annulus 5 may then be omitted.

For embodiments such as in FIGS. 5 and 6, wherein the conductor blades are mechanically and electrically separated, each pole axis is provided with a pair of brushes, one brush near the inner end and one near the outer end of the axis. These brushes are referred to as 7 and 17 and the brushes may be connected in a series circuit as shown in FIG. 5 between the transducing terminals 8.

The diagrams of FIGS. 7 and 8 respectively show, as a clearer illustration, the possibilities of interconnection of the brushes. These diagrams respectively relate to the embodiments of FIGS. 1–2 and of FIGS. 5–6 and show the rotors developed in linear representations. Said diagrams may further be considered, too, as linear developments of cylindrical rotors since the invention may be as well reduced to practice in cylindrical airgap as in axial airgap machines. In cylindrical machines, the blades 3 are extending along generants of a cylinder, and the brushes bear on the ends of said bars. The cylinder may be supported by end disc-shaped plates, for instance, for mounting the rotor on the shaft, the field magnets being arranged surrounding the rotor cylinder and a return magnetic flux cylinder being mounted within the rotor cylinder, either secured to the shaft or freely rotating thereon.

In the embodiments having an axial airgap, the magnetic return plate 15 might have been made a part of the rotor assembly, carrying the conductor blades glued on it, and the brushes being placed either on the same side as the magnets or maintained on the side of the plate 15 which has an outer and/or inner diameters leaving bare annuli for the application of the brushes to the blade ends.

The conductor blades 3 may be obtained from either a mechanical cutting or a chemical engraving or etching of a metal foil such as copper or other suitable conducting material. When obtained from etching, according to one of the known techniques of printed circuitry, the conductor foil may first be made adherent to a very thin insulating sheet and said sheet may either be removed after the etching or preserved in the final arrangement of the machine, as the printed conductors, as known, better resist electrical current overloads.

Such a printed-circuit technique may be specially of advantage when, according to FIGS. 9 and 10, the machine comprises a rotor with several conductor blade layers. In the example shown, there are two layers 1 and 21 which are relatively insulated from each other by a thin intercalar insulating film 28; the conductor 1 being formed over a thin insulating layer 18. The short-circuiting annuli 4 and 24 of the bars 3 and 23 may coincide and, in such a case, the conductors of the layer 21 are made shorter than those of the conductors of the layer 1 in the radial direction, for enabling the application of the brushes 7 and 27 on their respective layers. It must be understood that the brushes of the two sets 7 and 27 are series-connected between two terminals (not shown). The shaft 9 may be provided with an insulating sleeve 19 for attaching the rotor thereto. More than two layers may be provided in a rotor and it is not imperative that the permanent short-circuiting rings, when provided, be situated on the same edge in each layer.

The operation of such machines may be easily understood in considering that for any layer of conductor blades, the only blades active at any instant of time are those which are short-circuited by the brushes or more definitely are brought in closed circuits by the brushes. There will be a local circulation current between their ends which is of substantially negligible value since the electromotive forces are quite close in value in each of such sets of conductor blades. Of course, the active currents are reversed from pole to pole in the active conductor blades so that they add together and define the polarities on the terminals of the machine when used as generator, or the direction of rotation, when used as a motor. The greater the induction is along the pole axes, the more the efficiency will be increased, hence the advantage of concentrating the magnetic flux within restricted areas on the sides of such axes. When using separate magnets, one may even advantageously use soft iron pieces shaped for concentrating the magnetic flux from the magnets on such reduced areas.

What I claim is:

1. A low voltage high direct current dynamo-electric machine of the disc rotor type comprising in combination: a stator including an heteropolar field structure of permanent magnet poles and defining a magnetic airgap wherein in the orientation of the magnetic field regularly reverses in successive zones; a disc shaped rotor rotatably mounted within said airgap, said rotor comprising a plurality of conductor blades arranged in at least one layer with their greater dimensions substantially oriented along the greater direction of the airgap, said blades being at least partly bare on one of their faces near at least one end thereof; and brushes mounted in registration with the magnetic pole axes of said field structure and interconnected to D.C. transducing terminals, each one of said brushes electrically contacting and short-circuiting at least two of said conductor blades at ends and means for electrically connecting together other ends of said conductor blades to complete an electrical circuit only through those conductor blades which are in direct contact with said brushes.

2. Machine according to claim 1 wherein said electrical connecting means between said conductor blades comprises a conductive ring which is integral with one end of said conductor blades.

3. Machine according to claim 1 wherein said electrical connecting means between said conductor blades comprises a second set of electrically interconnected brushes.

4. Machine according to claim 1 having a large number of magnetic poles in the field structure and wherein the span of each pole area is narrow and up to about 60 electrical degrees.

5. Machine according to claim 4 wherein further the said magnetic poles are each shaped for concentrating the magnetic flux in the neighbourhood of their polar axis orientated along the greater dimension of the magnetic airgap.

6. Machine according to claim 1 wherein the conductor blades are adhering to a thin insulating sheet.

7. Machine according to claim 1 wherein at least at one end thereof the blades are stiffened by a mechanically rigid member insulatedly secured thereto.

8. Machine according to claim 1 wherein the rotor includes more than one layer of conductor blades, said layers being separated by thin insulating films and wherein the lengths of the blades in the greater dimension of the airgap are different from one layer to the other one so as to leave uninsulated in each layer at least one ring for application thereto of the brushes, the brushes associated to all layers being interconnected in series along a circuit ending in the said transducing terminals.

9. In a D.C. multipolar permanent magnetic flux machine of heteropolar character, a rotor structure comprising a plurality of conductor blades arranged in at least one layer, each blade being substantially oriented in the greater dimension of the magnetic airgap, said blades being open circuited at one end at least thereof, and a fixed structure of brushes comprising as many sets as are layers and in each set as many brushes centered on the axes of the magnetic axes of the heteropolar magnetic flux structure as are necessary to short-circuit at least two of said blades as they pass under said magnetic axes, said brushes being interconnected between at least one pair of direct current transducing terminals.

References Cited

UNITED STATES PATENTS

| | | | |
|---|---|---|---|
| 2,970,238 | 1/1961 | Swiggett | 310—268 |
| 3,084,420 | 4/1963 | Burr | 310—268 |
| 3,209,187 | 9/1965 | Angele | 310—266 |
| 3,263,143 | 7/1966 | Moressee | 310—268 |

FOREIGN PATENTS

| | | |
|---|---|---|
| 1,272,083 | 4/1961 | France. |
| 1,328,677 | 4/1963 | France. |
| 1,330,344 | 3/1962 | France. |
| 1,341,581 | 9/1962 | France. |
| 1,341,582 | 9/1962 | France. |

MILTON O. HIRSHFIELD, *Primary Examiner.*

D. F. DUGGAN, *Assistant Examiner.*